July 10, 1945.   C. W. CHASE   2,380,025
SEWAGE TREATMENT SYSTEM
Filed June 22, 1942
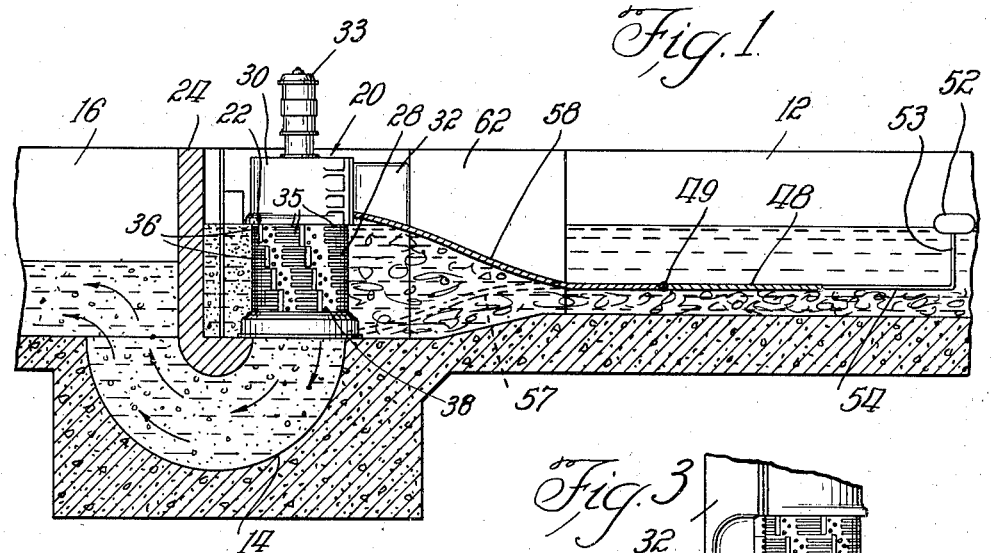
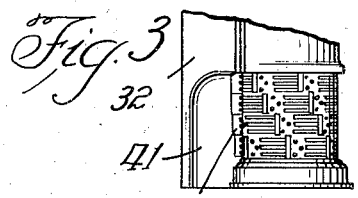
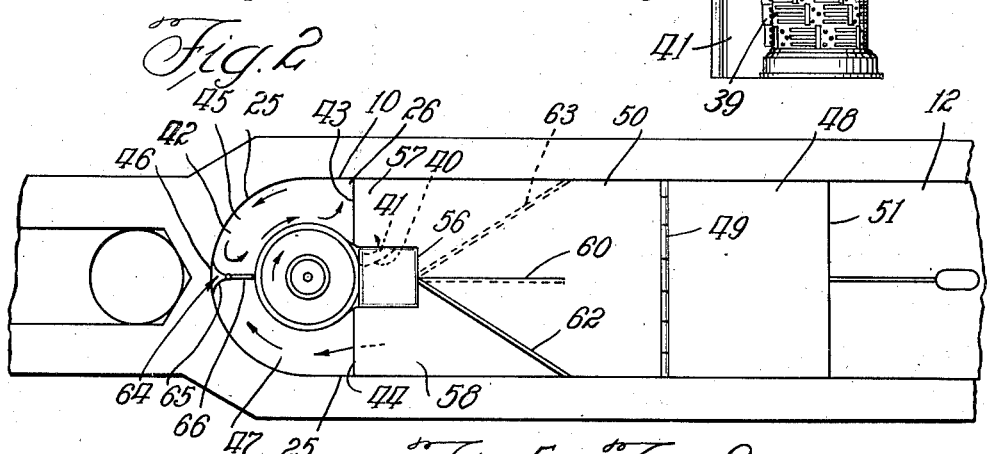
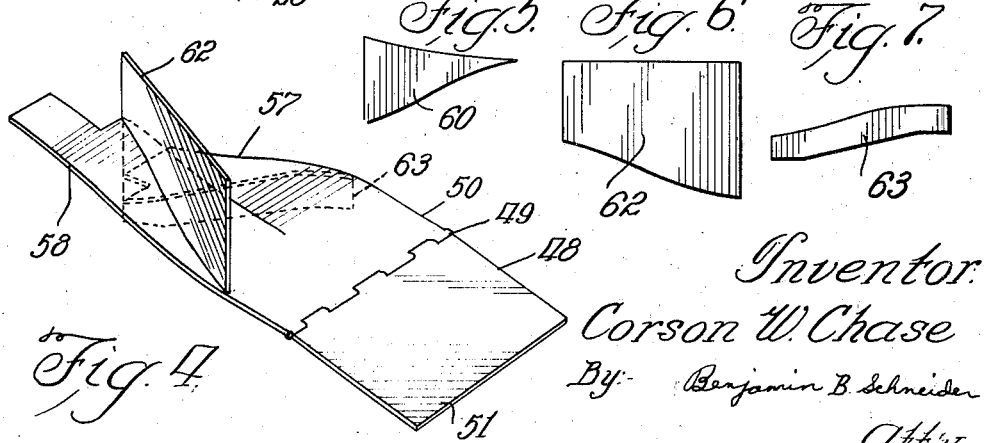
Inventor:
Corson W. Chase
By: Benjamin B. Schneider
Atty.

Patented July 10, 1945

2,380,025

UNITED STATES PATENT OFFICE 2,380,025

SEWAGE TREATMENT SYSTEM

Corson W. Chase, Chicago, Ill., assignor to Chicago Pump Company, a corporation of Illinois Application June 22, 1942, Serial No. 447,936

11 Claims. (Cl. 210—152)

This invention relates to improvements in method and systems for comminuting sewage solids. The comminutor hereinafter referred to is, preferably, but not necessarily, of the rotary screen type.

In the usual sewage system, a comminutor is installed in a basin which forms a part of the raw sewage channel. Solids carried by the sewage are strained therefrom by the comminutor and are then comminuted at a cutting zone by the coaction of moving or relatively moving cutting members. The small comminuted particles pass through the comminutor with the sewage liquor, to the downstream channel which may lead the sewage to a place for further treatment as is well-understood in the art.

The sewage from the channel usually enters the comminutor basin and some of the solids immediately enter the cutting zone and are comminuted either in whole or in part. The remainder of the solids along with recirculated partially comminuted solids are carried by the sewage liquor onto the screening member which, in turn, carries the solids to the cutting zone. As this process continues the solids are comminuted to the desired size and pass through the screening member.

In general, sewage consists of a sewage liquor, floating material, solids such as rags, paper, submerged pieces of wood and garbage, and grit. The latter generally comprises particles of sand, stone, cinders and dirt. The solids and grit along with some sewage liquor are, in the main, carried by the secondary currents of the flowing stream along the bottom of the influent channel. They are concentrated in a fairly well-defined stratum moving beneath and with the substantially grit-free sewage liquor. In the course of the sewage stream, the grit becomes enmeshed and embedded in the solids converting the latter into abrasive solids. As these solids are carried into the cutting zone they are comminuted in the presence of grit by the cutting members with consequent destructive wear thereon, due to the abrasive action of the grit previously embedded in the solids and additional grit which is beaten and embedded into the solids, or strained out in and upon the solids as they are interposed across the stream of gritty liquor flowing through openings in the screening member. As a result, costly repairs and replacements are frequently required to maintain the efficiency of the comminutor. In accordance with the present invention I overcome the objections in the prior art methods of comminuting sewage solids and I accomplish this as follows.

As the sewage flows through the raw sewage channel and before it enters the comminutor basin I divide the sewage stream into two portions, one, the sewage liquor portion or layer which is substantially free from grit and the other, the solids grit-containing portion or layer. The sewage liquor layer is then conducted into the comminutor basin in the region adjacent the cutting zone of the comminutor, swirls around one side of the comminutor and passes through the screen. The solids grit-containing layer is conducted into the comminutor basin in the region away from the cutting zone and flows against the screen and free grit and sewage liquor flows therethrough. The grit-containing solids are then carried by a screen member into the region where the substantially grit-free sewage liquor flows and swirls before passing through the screen and are there washed by the liquor with consequent removal of a major portion, if not substantially all, of the grit from the solids before the solids are entirely comminuted. The substantially grit-free solids are then comminuted in the usual manner.

By operating in accordance with the method of the present invention, the solids are not only freed from grit to a substantial extent when they are first brought into the cutting zone, but they are further washed and maintained substantially grit-free during comminution thereof because comminution takes place in the substantially grit-free sewage liquor which enters the comminutor basin adjacent the cutting zone. In consequence, the rate of wear on the cutting members is reduced to a minimum, thereby materially reducing maintenance costs. In addition, the efficiency of operation is maintained for longer periods of time than heretofore because the cutting members stay sharp for long periods of time and are able to comminute with less power. Since by operating in accordance with my invention the cutting members operate on a minimum of gritty abrasive material, it is possible to make these cutting members of less expensive and more readily obtainable metals than heretofore. The advantage of this, especially at present when the diversion of hard alloy cutting metals from war purposes is serious, is manifest.

The method of my invention will be illustrated in connection with a specific form of sewage treating system suitable for carrying my invention into effect. It will be understood, however, that the invention in its broader aspects is not to be regarded as limited to operation in the particular sewage system shown herein since this system is merely illustrative of a variety of systems and constructions that may be used in practicing my invention.

Referring to the drawing:

Figure 1 is a longitudinal elevational view, with parts in section, through a comminutor sewage channel construction embodying my invention and suitable for carrying out the method of my invention;

Fig. 2 is a plan view thereof;

Fig. 3 is a fragmentary elevational view of the comminutor showing the cutting comb;

Fig. 4 is a perspective view of the partition structure for sub-dividing the substantially grit-free sewage liquor layer from the grit-containing solids layer and for insuring that these layers will flow on opposite sides of the comminutor to the comminutor basin; and Figs. 5, 6 and 7 are elevational views of flow-directing portions of the partition structure.

In the drawing, the numeral 10 designates a comminutor basin or chamber of generally semi-circular section which communicates with and receives sewage from a raw sewage channel 12. The basin discharges into a reverse bend channel 14 which communicates with the effluent or downstream channel 16 through which the strained sewage is conveyed. The sewage channel so far described may be formed of concrete.

Comminutor 20, of conventional design and construction, is located in basin 10 above outlet channel 14, with the liquid intake 22 thereof facing wall portion 24 of the basin. Portion 24 is symmetrical with the basin ends 25 and 26, but any other position may be selected. As shown, ends 25 and 26 merge into the walls of channel 12. Comminutor 20 comprises a cylindrical screen 28 rotatably mounted in a stationary skeleton housing 30 which is bolted or otherwise secured to a standard 32. The screen is adapted to be driven by a motor 33 which is mounted on the housing.

Screen 28 may be made integral and, as shown, is provided with a plurality of vertical series of horizontal slots 35 through which liquid and comminuted particles discharge into the effluent channel. Vertical series of strips or shear bars 36 are provided between adjacent series of slots. Cutting teeth 38 are mounted on the imperforate portion of the screen wall behind the shear bars. A stationary cutting bar or comb 39 is mounted on standard 32 on one side thereof, adjacent end 26 of the basin wall. The stationary cutting bar cooperates with rotating cutting teeth 38 and shear bars 36 to comminute sewage solids. As is manifest, comminution of solids takes place at the region of the cutting bar and, for convenience, I call this region the cutting zone. Standard 32 is recessed vertically as at 40 to provide a recess or eddy space 41, adjacent cutting bar 39, for a purpose to be described.

The space between comminutor 20 and the basin wall is in the form of a curved path 42 open at both ends. These ends form inlets 43 and 44 to the path. Inlet 43 is adjacent the cutting zone and communicates with inlet channel 12, and inlet 44, remote from the cutting zone, also communicates with the inlet channel. Portion 45 of path 42 between inlet 43 and the apex 46 of the curve receives substantially grit-free sewage liquor from the inlet channel before it passes through the slots in screen 28 and portion 47 of path 40, between inlet 44 and apex 46, receives grit-containing solids and some sewage liquor from the inlet channel, as hereinafter described. These portions or passageways are of substantially the same size and shape and, as shown, are symmetrically disposed around the sides and in front of the comminutor. Because of this symmetrical arrangement, the flows in the respective passageways 45 and 47 are substantially of equal force and, at their meeting zone, in the region of apex 46, tend to neutralize each other, forming a neutral or substantially quiescent region in the vicinity of apex 46. This arrangement and shape of passageways 45 and 47, while preferred, is not essential since other suitable arrangements and shapes of passageways may be utilized in accordance with my invention. It is essential only that a passageway or region be provided adjacent the cutting zone into which substantially grit-free liquid flows before passing through the screen and another passageway or region into which grit, grit-containing solids and some liquid flow and from which the grit-containing solids may be carried to the first named region to wash grit from the solids to comminute the solids as hereinafter described.

Located in the inlet channel 12 is a horizontal partition 48, hinged for adjustment at 49 to stationary partition plate 50, which divides the sewage stream approaching the comminutor into an upper layer and a lower layer. The upper layer contains, primarily, the substantially grit-free sewage liquor and some floating solids and the lower layer contains the bulk of the usual sewage solids such as rags, paper, pieces of wood, garbage, etc., the bulk of the grit, mostly mineral matter such as sand, cinders and dirt from the streets, and some of the sewage liquor which carries these solids. As is well-known, a part of the grit becomes adhered to or enmeshed in the solids during normal sewage flow and these grit-containing solids, according to the heretofore practice, were comminuted in a grit-containing liquor with consequent destructive effects on the cutting members. In accordance with the present invention, these solids are washed to remove grit, as hereinafter described, before and as they are being comminuted, and are comminuted in a substantially grit-free liquor, thereby reducing wear on the cutting members and prolonging the efficiency thereof.

Partition 48 is normally positioned in the stream with its forward end 51 substantially at the zone of demarcation between the two layers. This zone is fairly well defined and, for a given sewage stream of fixed depth, is at a substantially fixed position above the bottom of the channel. Since the depth of the sewage stream in any given channel may vary from time to time, I provide a float 52, secured to partition 48 by a substantially vertical link or chain 53 and a horizontal link 54, to automatically position forward end 51 of the partition at the desired level for separating the two layers. The length of link 54 is proportioned with respect to the length of partition 48 to accomplish this at all average normal variations of flow.

Stationary partition plate 50, of metal or other suitable material, is slotted at its free end, as at 56, to receive standard 32, and is slit longitudinally from the slot to form two arms 57 and 58 which extend on either side of the standard. Arm 57 is bent downwardly towards the bottom of inlet 43 of the basin forming a ramp for the flow of substantially grit-free liquor to the basin. Arm 58 is bent upwardy toward the top of standard 32 to cause the channel below it to diverge uniformly for the purpose of distributing the grit-containing solids as uniformly as possible from the top to the bottom in that portion of the comminutor basin. A triangular shaped plate 60, with its base against standard 32, extends outwardly from the standard and joins the slit edges of bent arms 57 and 58 to close the gap formed by bending these arms and thereby prevent cross flows of the separated layers of the sewage stream. This plate insures that the separated layers of the sewage stream will flow without commingling towards the desired inlets to the curved path 42, the substantially grit-free liquor layer towards inlet 43 and the grit-containing solids layer towards inlet 44. The flows of these divided layers towards the desired inlets is insured by means of vertically disposed partitions 62 and 63, positioned, respectively, above and below partition plate 50. Partition 62 is angularly disposed from one wall of channel 12 towards inlet 43 and partition 63 is angularly disposed from the other wall of the channel towards inlet 44.

In carrying out the method of my invention with the comminutor and sewage channel construction described, screen 28 is continuously rotated in a direction opposite to the direction of flow of the substantially grit-free liquor layer entering inlet 42. The raw sewage stream is divided by partition 48 and the respective layers of the stream are introduced into the comminutor basin as described. The substantially grit-free sewage liquor flows in portion 45 of curved path 42 and passes through slots 35 of rotating screen 28. Eddies are formed in eddy space 41 and these impart a swirling motion to some of the incoming liquor and some of the liquor about to pass through the drum slots and this liquor is recirculated in portion 45 of curved path 42 before passing through the slots. The grit-containing solids layer, including some of the sewage liquor, flows in portion 47 of curved path 42 and the sewage liquor flows through the drum slots depositing the grit-containing solids on the rotating drum. The drum carries the solids into portion 45 where they are washed by incoming and recirculated substantially grit-free sewage liquor to remove grit therefrom before the drum carries the solids to cutting comb 39. The removed grit passes through the drum slots with the washing sewage liquor. By the time the solids reach the cutting comb most of the grit has been washed therefrom.

At the cutting comb, portions of the solids are nicked-off by cutting teeth 38 and these portions pass through the drum slots along with sewage liquor. The solids after being held momentarily at the cutting comb are caught by the eddies, recirculated in portion 45 and returned to the cutting comb for further comminution. While being thus comminuted and recirculated, the solids are further washed in the substantially grit-free liquor. It is manifest that by the method of my invention substantially grit-free solids are comminuted and that comminution takes place in substantially grit-free liquid. Consequently the grit is not forced and beaten into the solids while they are being comminuted, nor is grit strained into and upon the solids as they are interposed in the flow of liquor through the screen.

Due to the symmetrical arrangement of the comminutor within the basin as described, the flows of the respective layers of the sewage within curved path 42 tend to neutralize each other at substantially the region of the apex of the curve and hence the layers do not intermingle to any substantial extent at this region. To insure against intermingling of the layers, I provide a partition across path 42, indicated generally by the numeral 64, having a fixed portion 65 and a hinged portion 66. This partition prevents the layers from merging before entering the screen, yet permits the screened solids to be carried by the screen from portion 47 to portion 45 of path 42, as described. This partition is not essential in the arrangement shown, but may be used when the quantity of liquor entering paths 45 and 47 are not substantially of the same magnitude.

While I have described my invention in connection with a specific arrangement of the comminutor in the comminutor basin and a specific construction for subdividing the respective layers of the sewage and for introducing these layers into the basin, my method is not dependent on this arrangement or construction since it may be carried out with other arrangements and other channel constructions, as is obvious to a skilled worker in the art from the foregoing. Thus, for example, partition 48 need not be float-controlled to rise or fall with the liquid level in the sewage channel, but may be manually adjustable. This partition may even be dispensed with since separation of the sewage layers may be accomplished by the partitions 62 and 63 or either one of them alone. Also, it is manifest that the sewage channel may be so constructed that separation of the layers may be accomplished without the aid of partitions.

In the drawing and in the above description of my invention I have shown and described a preferred form of comminutor. It is to be understood that my invention is not to be construed as limited to this comminutor since the method of my invention may be carried out with a wide variety of comminutors. Thus, for example, the comminutor shown and described in my prior co-pending application Serial No. 294,147, filed September 9, 1939, may be used instead of the comminutor herein shown and described.

The method of my invention is not to be construed as limited to the comminution of sewage solids since it is also applicable to the comminution of waste materials and other solids carried by a flowing stream.

I claim:

1. The method of comminuting grit-containing solids carried by a flowing liquid stream in the lower portion thereof along with the major amount of the grit or other abrasive material in the stream comprising splitting the stream into an upper, substantially grit-free liquid portion and into the said grit-containing solids portion, conducting the upper portion to a region adjacent the cutting zone of a comminuting device and flowing said upper portion from said region through a screen, conducting the lower portion to a region remote from said cutting zone, filtering said portion through said screen to separate the grit-containing solids therefrom, carrying the said solids into said first-mentioned region and washing them in said grit-free liquid portion to separate grit from said solids, carrying said substantially grit-free solids to said cutting zone and comminuting them, and passing said comminuted solids through said screen for disposal.

2. The method of comminuting grit-containing solids carried by a flowing liquid stream in the lower portion thereof along with the major amount of the grit or other abrasive material in the stream comprising splitting the stream into an upper, substantially grit-free liquid portion and into the said grit-containing solids portion, conducting the upper portion to a region adjacent the cutting zone of a comminuting device and flowing said upper portion from said region through a screen, conducting the lower portion to a region remote from said cutting zone, filtering said portion through said screen to separate the grit-containing solids therefrom, carrying the said solids into said first-mentioned region and washing them in said grit-free liquid portion to separate grit from said solids, carrying said substantially grit-free solids to said cutting zone and cutting off portion therefrom, passing said cut portions through said screen for disposal, carrying the remainder of said solids to said first-mentioned region along with incoming substantially grit-free liquid and returning them to said cutting zone for further comminution and continuing this movement of the solids until they are reduced to a size capable of passing through the screen.

3. The method of comminuting grit-containing solids carried by a flowing liquid stream in the lower portion thereof along with the major amount of the grit or other abrasive material in the stream comprising splitting the stream into an upper, substantially grit-free liquid portion and into the said grit-containing solids portion, conducting the upper portion to a region adjacent the cutting zone of a comminuting device and flowing said upper portion from said region through a screen, conducting the lower portion to a region remote from said cutting zone, carrying the grit-containing solids contained in said lower portion from said remote region to said first-mentioned region and there washing the grit therefrom, carrying the washed solids to said cutting zone, comminuting the solids and passing the comminuted solids through said screen for disposal.

4. The method of comminuting grit-containing solids carried by a flowing liquid stream in the lower portion thereof along with the major amount of the grit or other abrasive material in the stream comprising splitting the stream into an upper, substantially grit-free liquid portion and into the said grit-containing solids portion, conducting the upper portion to one side of a comminuting device of a rotary screen comminutor position in the path of said stream, said side being adjacent to the cutting zone of said comminutor, flowing said upper portion in a region in front of a portion of said screen and from said region through said screen, conducting the said lower portion to the other side of said comminuting device and flowing it to a region in front of another portion of said screen and from said second-named region against the screen, filtering through the liquid portion of said lower portion for disposal and depositing said grit-containing solids onto the screen, carrying said grit-containing solids on said screen from said second-named region to the first-named region where said solids are washed by the said upper portion of said stream before it flows through the screen to separate grit from said solids, carrying said substantially grit-free solids on said screen to said cutting zone and comminuting them, and passing the comminuted solids through said screen for disposal.

5. In a system for comminuting sewage solids, a comminuting apparatus having a stationary cutting element on one side thereof where comminution takes place, a basin in which said apparatus is positioned having an outlet, a cylindrical screen rotatably mounted within said basin through which liquid and comminuted solids flow into said outlet, said basin having a wall shaped to define between it and said screen a curved path open at both ends, said ends forming inlets to said basin, one end of said path being adjacent said cutting element, a conduit communicating with said open ends through which a stream of raw sewage flows towards said basin, said stream including solids having grit or other abrasive material adhered to or enmeshed therein which flow with said stream in a lower portion thereof below the substantially grit-free sewage liquor, means in said conduit for separating said lower portion of the stream from said substantially grit-free sewage liquor and for conducting said liquor to the curved path through the open end of said curved path adjacent the cutting element and for conducting said lower portion to the curved path through said other open end, means for driving said screen to carry solids from the said lower portion in said curved path which have been deposited on said screen towards said cutting element and means carried by said screen for cooperation with said cutting element to comminute said solids.

6. In a system for comminuting sewage solids, a basin having an inlet and an outlet, a conduit communicating with said basin through which a stream of raw sewage flows, said stream having an upper, substantially grit-free sewage liquor portion and a lower portion including grit and solids having grit or other abrasive material adhered to or enmeshed therein, a comminuting apparatus including a cylindrical housing having an opening, a cylindrical screen rotatably mounted within the housing and designed to rotate across said opening and screen liquid passing therethrough, a second opening in said housing for wasting to said outlet liquid and comminuted particles which have passed into the housing through the screen and a cutting element positioned at one side of said first named opening, said comminuting apparatus being positioned in said basin with the first named opening facing a wall of said basin in the direction of flow in said conduit, said wall being shaped to define between it and said screen a curved path open at both ends, said ends of said path being in communication with said conduit and one of said ends being adjacent said cutting element, means in said conduit for separating said lower portion of the stream from said substantially grit-free sewage liquor and for conducting said liquor to the open end of said curved path adjacent the cutting element and for conducting said lower portion to said other open end, means for driving said screen to carry solids from the said lower portion in said curved path which have been deposited on said screen towards said cutting element and means including said cutting element for comminuting said solids.

7. In a system for comminuting sewage solids, a basin having an inlet and an outlet, a conduit communicating with said basin through which a stream of raw sewage flows, said stream having an upper, substantially grit-free sewage liquor portion and a lower portion including grit and solids having grit or other abrasive material adhered to or enmeshed therein, a comminuting apparatus including a cylindrical housing having an opening, a cylindrical screen rotatably mounted within the housing and designed to rotate across said opening and screen liquid passing therethrough, a second opening in said housing for wasting to said outlet liquid and comminuted particles which have passed into the housing through the screen and a cutting element positioned at one side of said first named opening, said comminuting apparatus being positioned in said basin with the first named opening facing a wall of said basin in the direction of flow in said conduit, said wall being shaped to define between it and said screen a curved path open at both ends, said ends of said path being in communication with said conduit and one of said ends being adjacent said cutting element, a horizontal partition in said conduit for separating said lower portion of the stream from said substantially grit-free sewage liquor and for conducting said liquor to the open end of said curved path adjacent the cutting element and for conducting said lower portion to said other open end, means for driving said screen to carry solids from the said lower portion in said curved path which have been deposited on said screen towards said cutting element and means including said cutting element for comminuting said solids.

8. In the system set forth in claim 7 wherein said horizontal partition is adjustable.

9. In the system set forth in claim 7 wherein the horizontal partition comprises a stationary rear portion and a forward portion hinged to said stationary portion, and wherein a float is secured to the hinged portion to make the latter move vertically in response to variations in depth of the sewage passing through said conduit.

10. In the system set forth in claim 7 wherein said first named conducting means comprises a passageway having a bottom wall which slopes downward from substantially the level of the partition to the bottom of said end of the curved path adjacent the cutting element of said comminuting device and wherein said other conducting means comprises a passageway having an upper wall which slopes upwardly from substantially the level of the partition towards the top of said cylindrical housing.

11. The method of comminuting grit-containing solids carried by a flowing liquid stream in the lower portion thereof along with the major amount of the grit or other abrasive material in the stream comprising separating the lower portion of said stream, including said grit and said grit-containing solids, from said stream in advance of a comminuting device, then separating said grit-containing solids from the lower portion of the stream, reintroducing the said solids into the stream from which the said lower portion has been separated and washing said solids therein to remove grit from the solids before passing said solids to the cutting members of said comminuting device, and then comminuting said solids.

CORSON W. CHASE.